United States Patent
Katzman et al.

(10) Patent No.: US 11,745,476 B2
(45) Date of Patent: Sep. 5, 2023

(54) DEVICE AND METHOD FOR FORMING A FUNCTIONAL FILM INTENDED TO BE LAMINATED ON AN OPTICAL ARTICLE

(71) Applicants: Essilor International, Charenton-le-Pont (FR); SHAMIR OPTICAL INDUSTRY LTD, Shamir (IL)

(72) Inventors: Youval Katzman, Shamir (IL); Marc Peter, Horgen (CH); Christelle Marck, Charenton-le-Pont (FR); Jeanne Marchal, Charenton-le-Pont (FR)

(73) Assignees: Essilor International, Charenton-le-Pont (FR); Shamir Optical Industry Ltd, Shamir (IL)

( * ) Notice: Subject to any disclaimer, the term of this patent is extended or adjusted under 35 U.S.C. 154(b) by 0 days.

(21) Appl. No.: 17/254,657

(22) PCT Filed: Jun. 28, 2019

(86) PCT No.: PCT/EP2019/067334
§ 371 (c)(1),
(2) Date: Dec. 21, 2020

(87) PCT Pub. No.: WO2020/002606
PCT Pub. Date: Jan. 2, 2020

(65) Prior Publication Data
US 2021/0283888 A1      Sep. 16, 2021

(30) Foreign Application Priority Data

Jun. 28, 2018 (EP) .................................... 18305830

(51) Int. Cl.
| | |
|---|---|
| *B32B 27/08* | (2006.01) |
| *B32B 1/00* | (2006.01) |
| *B32B 7/12* | (2006.01) |
| *B32B 27/36* | (2006.01) |
| *B32B 37/10* | (2006.01) |
| *G02C 7/02* | (2006.01) |

(52) U.S. Cl.
CPC ................ *B32B 27/08* (2013.01); *B32B 1/00* (2013.01); *B32B 7/12* (2013.01); *B32B 27/36* (2013.01);
(Continued)

(58) Field of Classification Search
CPC .. B32B 27/08; B32B 1/00; B32B 7/12; B32B 27/36; B32B 37/10; B32B 2551/00;
(Continued)

(56) References Cited

U.S. PATENT DOCUMENTS

| | | | |
|---|---|---|---|
| 2,367,779 | A | 1/1945 | Hull |
| 4,038,014 | A | 7/1977 | Dusza et al. |

(Continued)

FOREIGN PATENT DOCUMENTS

| | | |
|---|---|---|
| CN | 101180177 A | 5/2008 |
| CN | 101389985 A | 3/2009 |

(Continued)

OTHER PUBLICATIONS

Office Action issued in Chinese Patent Application No. 201980043214.8 dated Jan. 24, 2022.
(Continued)

*Primary Examiner* — Brian Handville
(74) *Attorney, Agent, or Firm* — NIXON & VANDERHYE

(57) ABSTRACT

A film structure including at least a functional film, a carrier layer, and a counter-force liner, the functional film being in between the carrier layer and the counter-force liner. The carrier layer and the counter-force liner are larger than the receiving area, and the film structure includes a fastener adapted to fasten, directly or indirectly, the counter-force liner to the carrier layer at least on a portion of a zone outside the functional film. It is also proposed a corresponding
(Continued)

machine, optical device and method for forming a functional film intended to be laminated on an optical article.

18 Claims, 3 Drawing Sheets

(52) U.S. Cl.
CPC ............... *B32B 37/10* (2013.01); *G02C 7/02* (2013.01); *B32B 2551/00* (2013.01); *G02C 2202/16* (2013.01)

(58) Field of Classification Search
CPC .. G02C 7/02; G02C 2202/16; B29D 11/0073; B29C 51/008; B29C 51/10; B29C 51/14; B29C 51/28
See application file for complete search history.

(56) References Cited

U.S. PATENT DOCUMENTS

| | | |
|---|---|---|
| 4,180,426 A | 12/1979 | Oustin et al. |
| 4,504,341 A | 3/1985 | Radzwill et al. |
| 2007/0209393 A1 | 9/2007 | Miller et al. |
| 2009/0084493 A1 | 4/2009 | Westerdahl et al. |
| 2009/0283924 A1 | 11/2009 | Jiang et al. |
| 2011/0146893 A1 | 6/2011 | Marty et al. |
| 2017/0329197 A1 | 11/2017 | Yashiro et al. |

FOREIGN PATENT DOCUMENTS

| | | |
|---|---|---|
| CN | 107533181 A | 1/2018 |
| CN | 108025517 A | 5/2018 |
| EP | 0 410 599 | 1/1991 |
| GB | 1 292 905 A | 10/1972 |
| WO | 2014/188619 A1 | 11/2014 |
| WO | 2017/168192 | 10/2017 |

OTHER PUBLICATIONS

Office Action issued in Brazilian Patent Application No. BR112020023520-2 dated Dec. 21, 2022.
International Search Report for PCT/EP2019/067334 dated Sep. 17, 2019, 4 pages.
Written Opinion of the ISA for PCT/EP2019/067334 dated Sep. 17, 2019, 7 pages.

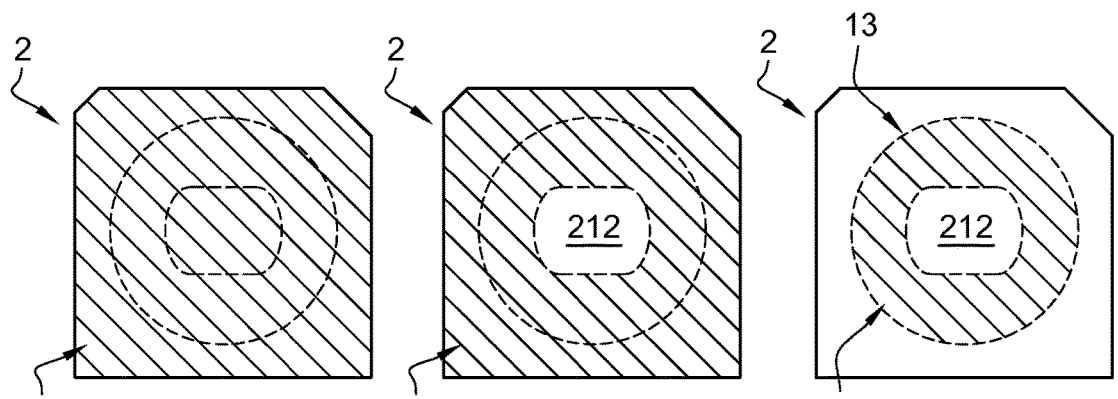
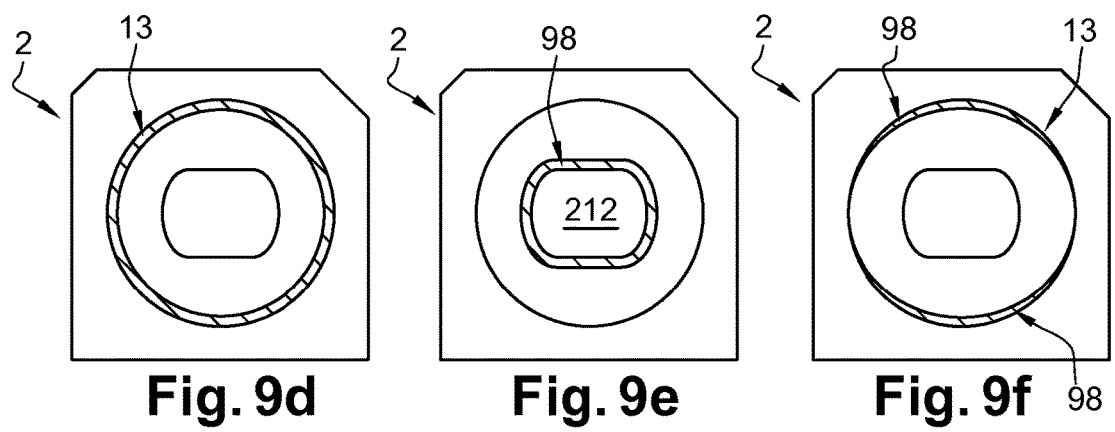
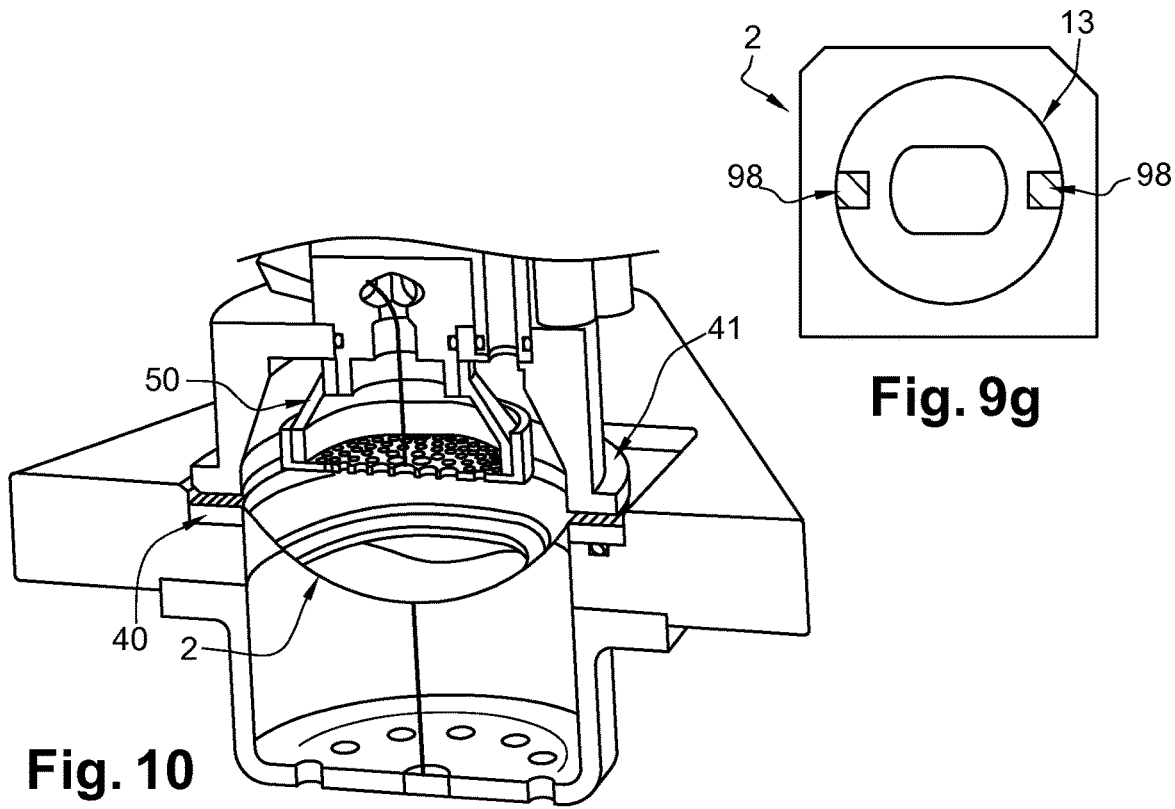

DEVICE AND METHOD FOR FORMING A FUNCTIONAL FILM INTENDED TO BE LAMINATED ON AN OPTICAL ARTICLE

CROSS-REFERENCE TO RELATED APPLICATIONS

This application is the U.S. national phase of International Application No. PCT/EP2019/067334 filed Jun. 28, 2019 which designated the U.S. and claims priority to EP 18305830.4 filed Jun. 28, 2018, the entire contents of each of which are hereby incorporated by reference.

TECHNICAL FIELD

The disclosure relates to the field of optical articles. The disclosure concerns more specifically a film structure for forming a functional film intended to be laminated on a receiving face of an optical article. The disclosure further concerns an optical device and a method for forming said functional film.

DISCUSSION OF THE BACKGROUND

Optical articles, such as ophthalmic lens, involve the behavior and properties of light, as for example of the visible light. An optical article comprises at least one optical surface and the light path results from interactions of the light with at least said optical surface.

For enhancing the performance of an optical article, it is known to provide a functional film on a receiving surface of the optical article. The functional film may modify the optical, transmission or mechanical properties of the optical article. For instance, the functional film may provide a polarization or tinting filter, a hard-coat function, an anti-reflective function, a protective coat and a surface quality function.

The functional film is intended to be laminated on the receiving surface of the optical article. Before lamination step, the functional film needs to be shaped with a curvature that complies with the curvature of the receiving surface of the optical article.

To this end it is known to place the functional film on a plastic carrier layer, for example in poly ethylene terephthalate (PET) and to apply pressure and temperature on the face of the carrier opposed to the functional film to inflate the carrier layer that pushes onto the functional film for forming a curved functional film.

However, it has been observed that the resulting curvature of the functional film may not be adequate with regard to the targeted curvature.

The purpose of the disclosure is to provide a solution for forming a functional film that enables to form said functional film with a curvature corresponding to the targeted curvature.

SUMMARY

It is proposed a film structure, also referred as a multi-layered film, comprising at least a functional film, a carrier layer, and a counter-force liner, said functional film being in between said carrier layer and said counter-force liner in a predetermined receiving area, the carrier layer and the counter-force liner being larger than the functional film, and the counter-force liner being fastened to the carrier layer, directly or indirectly, at least on a portion of a zone outside the receiving area on at least two opposite sides of the receiving area.

It is also proposed a device comprising at least a carrier layer, a counter-force liner, said carrier layer and said counter-force liner being adapted to receive a functional film between said carrier layer and said counter-force liner in a predetermined receiving area, the carrier layer and the counter-force liner being larger than the receiving area, and the device comprising fastening means adapted to fasten, directly or indirectly, the counter-force liner to the carrier layer at least on a portion of a zone outside the receiving area on at least two opposite sides of the receiving area.

The functional film has an area that is inferior to the one of the carrier layer and to the one of the counter-force liner. During a forming step that causes the carrier layer and the functional film to get a curved shape, with the liner forming a concave face and the counter force liner forming a convex face, the counter-force liner enables the functional film to be maintained on the carrier, in contact with said carrier on the whole surface of the functional film, preventing thus detachment of part of the functional film with regard to said carrier layer.

Conversely, such a detachment may occur if said counter-force liner was not used as the functional film own rigidity may slightly resist the forming imposed by the carrier layer and the edges of the functional film may partially delaminate from the carrier layer. Thus, when forming, the curvature of the functional film follows the curvature of the carrier layer, and the counter-force liner helps to maintain the functional film in contact with the carrier layer, in particular at the edges of said functional film. As a result, the obtained curvature of the formed functional film better corresponds to the targeted curvature according to which the carrier layer is inflated.

An alternative could be to use fixing means strong enough that the functional film may not delaminate from the carrier. However, such fixing means may thus make it difficult to remove the carrier from the functional film once the functional film is attached to an optical article.

In other words, the functional film may be sandwiched between the carrier layer and the counter-force liner so as to be compelled to follow the inflation of the carrier layer during the forming step until obtaining the targeted curvature without having edges or part that delaminate from the carrier layer during the forming.

According to a particular aspect, the area of the counter-force liner is superior to the one of the carrier layer.

According to a particular aspect, the fastening means enable to fasten the counter-force liner to the carrier layer in at least three non-aligned points which are positioned around the receiving area.

According to a particular aspect, the fastening means enable to fasten the counter-force liner to the carrier layer substantially all around the receiving area.

According to a particular aspect, the functional film comprises at least a functional thermoplastic film.

According to an embodiment, when the functional film is present in the receiving area and when a pressure difference is applied on the carrier layer to inflate the carrier layer towards the counter-force liner, the functional film pushes onto the counter-force liner, while said counter-force liner applies a counter-force onto said functional film. More precisely the carrier layer pushes onto the functional film and part of the counter-force layer, and the functional film pushes onto the counterforce layer.

The counter-force applied by said counter-force liner onto the functional film, in response to the pressure that is applied to the carrier layer and transmitted by the functional film to said counter-force liner, forces the functional film tightly up against the carrier layer to form the functional film with the targeted curvature in a reliable way.

According to a particular aspect, before the forming step, the carrier layer, the functional film and the counter-force liner, are positioned in contact with each other or close enough from each other so that inflation of the carrier layer causes the functional film to contact the counter-force liner.

According to an embodiment, the counter-force liner is more flexible than the carrier layer.

The counter-force liner can thus be curved when pressure is applied on the carrier layer, so as to let the functional film be shaped according the targeted curvature, while helping to maintain the functional film pressed and tightened on the carrier layer and without increasing too much the pressure needed for forming the carrier layer at the targeted curvature.

According to an embodiment, the counter-force liner is adapted to be fastened to the carrier layer with direct contact between the carrier layer and the counter-force liner.

To this end the fastening means may comprise at least one, or a combination of part of or of all of the following means:
  a clamp;
  electrostatic forces, in particular in between parts of the carrier layer and the counter-force liner which are out of the receiving area,
  glue or adhesive, in particular in between parts of the carrier layer and the counter-force liner which are out of the receiving area;
  thermoplastic welding, in particular on parts of the carrier layer and the counter-force liner which are out of the receiving area;

According to an embodiment in which the functional film is present in the receiving area in-between the carrier layer and the counter force liner, a carrier-side sliding layer is positioned in between said carrier layer and said functional film, said carrier-side sliding layer being adapted to enable a positioning float of the functional film with regard to the carrier layer.

Such a carrier-side sliding layer enables slight auto-adjustment of the positioning of the functional film with regard to the carrier layer during curving of the carrier layer and of the functional film. Said float may lead to a slight lateral displacement of the functional film with regard to the carrier layer.

The positioning float enabled by the sliding property of the carrier-side sliding layer prevents occurrence of defects such as creases on the functional film that would result from stresses transferred during the carrier layer inflation. In particular some stress formed by the material of the carrier layer stretching during the forming might be transferred to the functional film. The float enables the functional film to stretch less than without such float or even to maintain its size sensibly constant even while its curvature changes.

According to a particular aspect, said carrier-side sliding layer is adapted to make the functional film adhere to the carrier layer, while enabling said positioning float of the functional film with regard to the carrier layer.

According to a particular embodiment, the carrier side adhesive may be chosen has having a lower adhesive property compared to the adhesive property that should be chosen if the counter force liner was not used. In particular, the adhesive may be chosen to have adequate sliding properties to form a sliding layer without needing to have high adhesive properties. Indeed, the major fastening effect is provided by the counter-force liner. The adhesive may only have enough adhesion so as to maintain the functional film onto the carrier while it is yet planar.

According to an embodiment in which the functional film is present in the receiving area in-between the carrier layer and the counter force liner, a liner-side sliding layer is adapted to enable a positioning float of the functional film with regard to the counter-force liner, the liner-side sliding layer being positioned in between said counter force layer and said functional film, either in contact with the counter-force liner or with a layer fastened to the counter-force liner.

Such a liner-side sliding layer enables adjustment of the positioning of the functional film with regard to the counter-force liner, during curving of the carrier layer and the functional film. The positioning float enabled by the sliding property of the liner-side sliding layer prevents occurrence of defects such as creases on the functional film that would result from the counter-force application of the counter-force liner. In particular some stress formed by the material of the counter-force liner stretching during the forming might be transferred to the functional film. The float enables the functional film to stretch less than without such float or even to maintain its size sensibly constant even while its curvature changes. Said float may lead to a slight lateral displacement of the functional film with regard to the liner-side sliding layer.

According to a particular aspect, the liner-side sliding layer is also adapted to, when the functional film is present in the receiving area, make the functional film adhere to the counter-force liner or to a layer fastened to the counter-force liner.

According to an embodiment, an adhesive layer, such as a Pressure Sensitive Adhesive (PSA), is positioned in between the functional film and the liner-side sliding layer.

The adhesive layer may be part of the liner-side sliding layer.

According to an embodiment, the liner-side sliding layer is an optical grade material and is designed to be laminated onto an optical article so as to fasten the functional film to said optical article. According to a particular aspect, the liner-side sliding layer is covered with a protective layer. Advantageously, the protective layer has a low-friction surface, that preferably includes silicone, and is adapted to slide against the liner-side sliding layer.

In an embodiment, the liner-side sliding layer has a high smoothness and is designed to be laminated onto an optical article so as to fasten the functional film to said optical article. Within this embodiment the liner-side sliding layer may thus be an adhesive, such as a PSA.

According to a particular aspect, the liner-side sliding layer is part of the functional film. In other words, the liner-side sliding layer can be provided with the functional film.

According to an embodiment, the functional film being present in the receiving area, the counter-force liner is adapted to be in contact with the carrier layer for substantially each zone of the counter-force liner which is not in contact with the functional film or which is not in the receiving area.

It should be understood that "the counter-force liner is adapted to be in contact with the carrier layer" means that, before forming, the counter-force liner and the carrier layer may be separated from each other by gas such air, but that, after forming, or at least during part of the forming step, said counter-force liner and carrier layer are in contact.

According to an embodiment, said film structure also comprises a gas venting system configured for enabling gas that is present in the vicinity of the receiving area, in between the carrier layer and the counter-force liner, to exhaust at least partially out of said vicinity.

According to a particular embodiment, the gas venting system comprises one part included in the film structure and one part included in a machine for forming a functional film, for instance as proposed below. These parts of the gas venting system are configured to cooperate one with the other for enabling gas exhausting.

It is also proposed a machine for forming a functional film of a film structure according to any embodiments recited above, wherein the machine comprises a pressurizing system and a holding device for holding the film structure, pressurizing system and a holding device being arranged, to when the film structure is held at its periphery outside the functional film, apply a pressure difference on the carrier layer to inflate the carrier layer towards the counter-force liner, so that the functional film pushes onto the counter-force liner, while said counter-force liner applies a counter-force onto said functional film.

It is also proposed a method for forming a functional film for lamination on an optical article, said method comprising the following steps:
  providing a functional film and a device or film structure according to anyone of the embodiments detailed herein, such that the counter-force liner is fastened to the carrier layer and the functional film is fastened in between the carrier layer and the counter-force liner;
  forming the functional film by applying a difference of pressure on the carrier layer so as to inflate the carrier layer towards the counter-force liner; the counter-force liner applying a counter-force to the functional film.

According to an embodiment of the method, the forming step is a thermoforming step that further comprises heating the carrier layer, the functional film and the counter-force liner.

According to an embodiment of the method, after forming the functional film, the counter-force liner is detached from the functional film and from the carrier layer.

According to an embodiment of the method, after forming the functional film, the functional film is further attached to an optical article by means of an adhesive layer.

It is also proposed a device, preferably a multi-layered film, said device comprising at least a carrier layer, a counter-force liner and adapted to receive a functional film layer arranged between said carrier layer and said counter-force liner in a predetermined receiving area, wherein said device comprises also:
  a gas venting system configured for enabling gas that is present in the vicinity of the receiving area in between the carrier layer and the counter-force liner to exhaust at least partially out of said vicinity even when said functional film is present in said receiving area in between the carrier layer and the counter-force liner.

According to a particular aspect, the gas venting system is arranged, in plan view of the device, so as to extend beyond the receiving area.

According to a particular aspect, the gas venting system comprises an elevating structure that is arranged between the carrier layer and the counter-force liner. The elevating structure may comprise a part of the carrier layer that forms at least one ridge directed towards the counter-force liner or an elevating tape, taped onto the counter-force liner or onto the carrier layer.

According to a particular aspect, the gas venting system comprises a depression or groove arranged in a face of the counter-force liner directed towards the carrier layer, and/or a depression or groove arranged in a face of the carrier layer directed towards the counter-force liner.

According to a particular aspect, the gas venting system is configured such that the gas, that is present in the vicinity of the receiving area in between the carrier layer and the counter-force liner, exhaust through the counter-force liner and/or the carrier layer.

According to a particular aspect, at least one the counter-force liner and the carrier layer is permeable to air in at least an exhaust zone in the vicinity of the receiving area.

According to a particular aspect, at least one of the counter-force liner and of the carrier layer comprises holes or micro-holes in at least a venting zone in the vicinity of the receiving area.

According to a particular aspect, the venting zone covers only an area in the vicinity of the receiving area.

According to a particular aspect, the venting zone covers only part of the perimeter of the receiving area.

According to a particular aspect, a functional film is in the receiving area, sandwiched by the carrier layer and the counter-force liner.

According to a particular aspect, the device comprises also a clamping member; and the gas venting system comprises a groove arranged in a face of the clamping member, said face being intended to be applied on the device during the thermoforming operation of the device.

According to a particular aspect, the gas venting system opens at the outer contour of the device.

According to a particular aspect, in plan view, the gas venting system is positioned along a diametric axis of the device.

It is also proposed an optical device comprising
  an optical article;
  a functional film layer of a film structure or of a device according to any embodiments recited above,
  wherein said functional film layer is arranged on a receiving face of the optical article.

According to a particular aspect, a pressure sensitive adhesive layer is present between said receiving face and said functional film layer.

LIST OF FIGURES

For a more complete understanding of the description provided herein and the advantages thereof, reference is now made to the brief descriptions below, taken in connection with the accompanying drawings and detailed description, wherein like reference numerals represent like parts.

FIGS. 5 to 8 and 9a to 9g are schematic plan views of multi-layered films according to embodiments, provided with various gas venting systems;

FIG. 10 is a partial schematic view of a thermoforming machine that can be used to inflate a multi-layered film, according to an embodiment.

DETAILED DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments.

Figure 1:
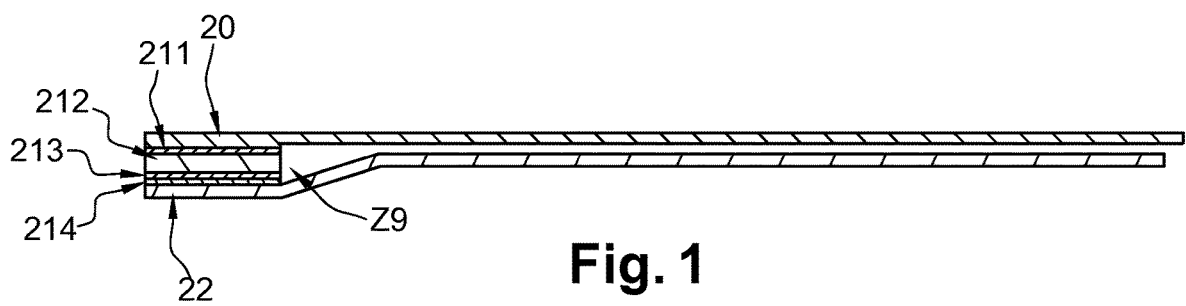
FIG. 1 is a half cross-sectional schematic view of a multi-layered film according to an embodiment.
Figure 2:
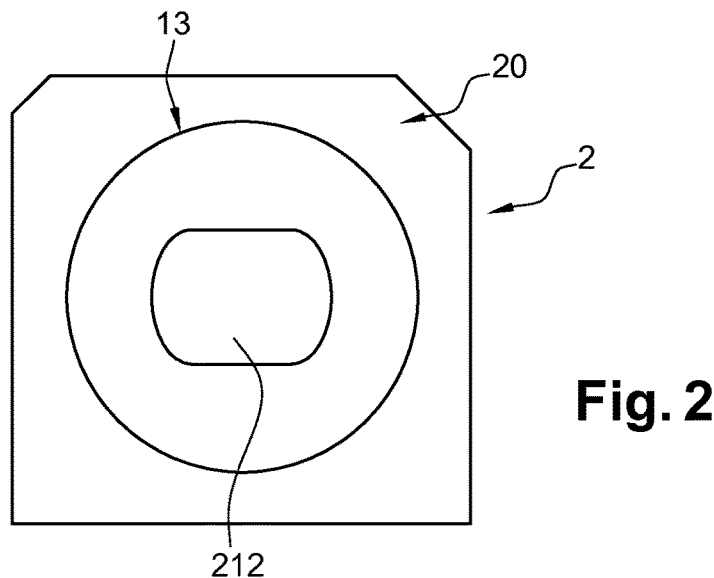
FIG. 2 is a plan schematic view of the multi-layered film of FIG. 1, showing the position of the functional film and the position of a clamping zone outside around said functional film.
Figure 3:
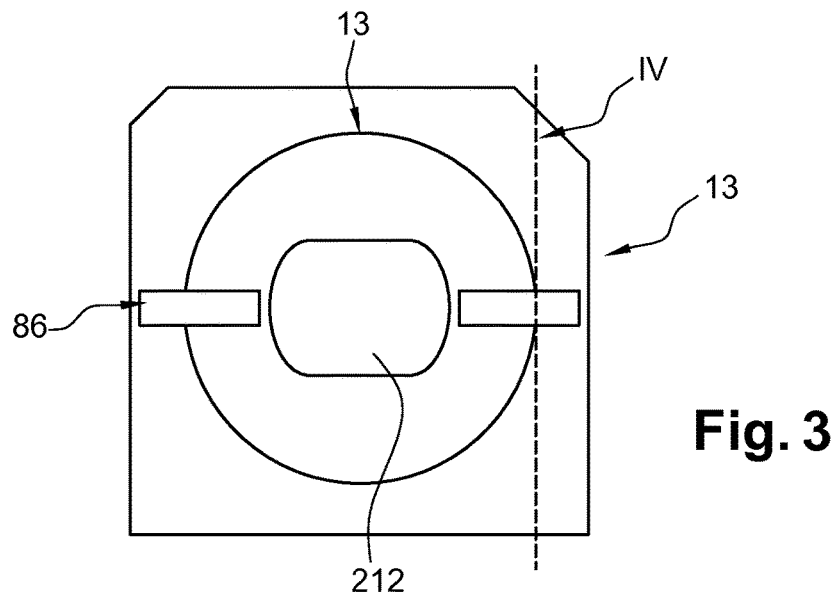
FIG. 3 is a plan schematic view of a multi-layered film according to an embodiment; wherein the multi-layered film is provided with a gas venting system arranged, in plan view, on both sides and outside the functional film.

FIG. 1 shows half part of a cross sectional view of a multi-layered film 2 that may also be referred as a consumable stack. The term "stack" refers to the stack of layers that form said multi-layered film 2, while the term "consumable" refers to the fact that at least a part of said multi-layered film 2, that comprises a functional film (hereby presented), is intended to be laminated on a surface of an optical article.

The thickness of the multi-layered film 2 may be in the range of 150 to 1500 um.

In the following description, the optical article is an ophthalmic lens. In other embodiments, the optical article may be other ophthalmic elements and devices, display elements and devices. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. The optical article is preferably a lens, and more preferably an ophthalmic lens.

Multi-Layered Film

The multi-layered film 2 comprises a carrier layer 20 and a counter-force liner 22. The carrier layer 20 can be made of a composition comprising polyethylene terephthalate (PET). The thickness of the carrier layer 20 may be in the range of 50 to 500 um. The counter-force liner 22 can be made of a composition comprising polyethylene terephthalate (PET) or polyester (PE). The thickness may be in the range of 50-500 um. According to a particular aspect the counter-force liner 22 comprises silicone, in particular on its side that faces the carrier layer. The counter force liner may be a PPI Adhesive Product sold under reference PPI 0601 (0.075 mm) SILICONISED POLYESTER FILM.

A functional film 212 extends between said carrier layer 20 and said counter-force liner 22 in a predetermined receiving area. The functional film can be one layer or can be formed of a stack of layers.

The receiving area corresponds to a region immediately present around the functional film, modulo a space allowing for any small positioning float around an initial positioning of the functional film.

The functional film may modify the optical, transmission or mechanical properties of the optical article. For instance, the functional film may provide any of a polarization, a tint, or a tinting filter, a hard-coat function, an anti-reflective function, a protective coat and/or a surface quality function or a combination thereof.

The functional film 212 comprises preferably a thermoplastic plastic film with a haze value of preferably no greater than 0.4%, the functional film as a whole having a haze value of preferably no greater than 0.4% once removed from both the carrier and the counter-force liner and from any protective film destined to be removed once the functional film is present and fixed onto the optical article.

Haze value is measured by light transmission measurement using the Haze-Guard Plus© haze meter from BYK-Gardner (a color difference meter) according to the method of ASTM D1003-00, which is incorporated herein in its entirety by reference. All references to "haze" values in this application are by this standard. The instrument is first calibrated according to the manufacturer's instructions. Next, the sample is placed on the transmission light beam of the pre-calibrated meter and the haze value is recorded from three different specimen locations and averaged.

The thickness of the functional film 212 may be in the range of 10-500 um. The functional film 212 can be made of a composition comprising polyethylene terephthalate (PET), and/or polycarbonate and/or cellulose triacetate (TAO, for triacetate cellulose, in French) that may be coated with a hard coat (HC) or an antireflective (AR) coating.

Further, the functional film may generally comprise further layers that enable some of the functions above-mentioned.

The carrier layer 20 and the counter-force liner 22 are larger, at least in one dimension, than the receiving area, and in particular than the functional film intended to be present in the receiving area. In particular, as illustrated in the various embodiments of FIGS. 1 to 9, the perimeter of the functional film layer 212 is surrounded by the perimeter of the carrier layer 20 and by the perimeter of the counter-force liner 22. This, in particular, enables to hold, fix or clamp, the carrier layer 20 to a machine or device without clamping, polluting, dirtying or applying stress onto the functional film.

According to various embodiments other intermediate layer(s) can be positioned between, on the one hand, the functional film 212 and, on the other hand, the carrier layer 20 and/or the counter-force liner 22. According to a particular aspect, the carrier layer 20 and the counter-force liner 22 are also larger at least in one dimension than said intermediate layer(s).

According to various embodiments, in a plan view, the carrier layer 20 and the counter-force liner 22 extend all around the stack of intermediate layers that comprises at least the functional film, and are thus larger than the functional film in both dimensions of said plan view. Preferably, in a plan view, such stack of intermediate layers is positioned in the central region of the carrier layer 20 and of the counter-force liner 22. The counter-force liner 22 and the carrier layer 20 are sensibly of the same dimensions and overlap each other to sandwich the functional film or the corresponding stack of intermediate layers. The area of the counter-force liner 22 is preferably slightly superior to the one of the carrier layer 20 to take into account the thickness of the functional film, or of the stack of intermediate layers, that may be overlapped by said counter-force liner 22. Indeed, a small step is thus formed by the functional film, and while the carrier layer 20 is mostly plan, before the forming step, the counter-force liner 22 is such that its shape allows for said small step.

A carrier-side sliding layer 211 may be positioned in between the carrier layer 20 and the functional film 212. Said carrier-side sliding layer 211 is adapted to enable a positioning float of the functional film 212 with regard to the carrier layer 20. Said in other words, the carrier-side sliding layer 211 is adapted so as to reduce a radial stress that would be imposed on the functional film 212 if it were to be too strongly fixed to the carrier layer 20. It is considered that during the forming step there is a point of maximum elevation from the initial plan. The radial stress mentioned above would be estimated to extend sensibly radially from said point of maximum elevation.

The thickness of the carrier-side sliding layer 211 may be in the range of 10-500 um.

According to an embodiment, the carrier-side sliding layer 211 may comprise a double coated tape provided by company 3M under product reference 9088 (or also referred as "High Performance Double Coated Tape 9088 with adhesive 375").

According to another embodiment, the carrier-side sliding layer 211 may comprise an acrylic adhesive layer. The carrier-side sliding layer may have an all-light transmissivity of 90% or more, and/or a Haze value of 1.0 or less. The carrier-side sliding layer may have dry and wet adhesion properties of 25 N/25 mm or more, according to a testing method using:

tensile meter substrate of polycarbonate plate with corona treatment, peeling angle of 90° and peeling speed: 25 mm/min backing material: Polyethylene terephthalate film with corona treatment laminating condition onto polycarbonate plate: one round trip with a 2 kg roller.

The acrylic adhesive layer can be sandwiched between two PET release liners. One of the PET release liners may have a peelability of 0.2 N/50 mm or less, and the other PET release liners may have a peelability of 1.0 N/50 mm or less, according to a testing method using a tensile tester, a peeling speed of 0.3 m/min and a peeling angle of 180°.

A liner-side sliding layer 214 may be positioned in contact with the counter-force liner 22 or with a layer fastened to the counter-force liner 22. The liner-side sliding layer 214 enables a positioning float of the functional film 212 with regard to the counter-force liner 22. Said in other words, the liner-side sliding layer 214 is adapted so as to reduce a radial stress that would be imposed on the functional film 212 if it were to be too strongly fixed to the counter-force liner 22. It is considered that during the forming step there is a point of maximum elevation from the initial plan. The radial stress mentioned above would be estimated to extend sensibly radially from said point of maximum elevation.

The liner-side sliding layer 214 can be made of a composition comprising polyethylene (PET). Alternatively, the liner-side sliding layer 214 may be made of a composition identical or similar to the one of the carrier-side sliding layer 211 proposed above. Alternatively, the liner side sliding layer, may be a pressure sensitive adhesive (PSA) according to PCT-Application No WO2017168192 filed on Mar. 29, 2016, included herein by reference. Said PSA further has the property of being an optical grade material with a haze value of preferably no greater than 0.4%.

The liner-side sliding layer 214 may comprise a layer of silicone on one or both sides. The thickness of the liner-side sliding layer 214 may be in the range of 10-100 um. In particular, the counter-force liner 22 may comprise, at least on an area in contact with the liner-side sliding layer 214 a layer of silicone.

According to particular aspects, intermediate layer(s), such as said carrier-side sliding layer 211 and/or said liner-side sliding layer 214, may be positioned in the stack at various times with regard to the time of positioning one or more other layers of said multi-layered film 2. For instance, the carrier-side sliding layer 211 can be positioned directly or indirectly upon the carrier layer 20 while the functional film 212 is already present or not yet present. In particular, the carrier-side sliding layer 211 and/or the liner-side sliding layer 214 may be introduced in between the carrier layer 20 and the counter-force liner 22 before introducing the functional film 212, or may be introduced at the same time that the functional film is introduced, for example by being attached to the functional film. Alternatively, the carrier-side sliding layer 211 may be deposited on the carrier layer 20 before introducing the functional film 212 and the liner-side sliding layer 214 may be deposited on the functional film 212 before applying the counter-force liner in contact with the functional film 212.

As illustrated in the embodiment of FIG. 1, the multi-layered film 2 may also include an adhesive layer 213, such as a Pressure Sensitive Adhesive (also referred as PSA) layers, in between the functional film 212 and the liner-side sliding layer 214. The adhesive layer 213 may be made of a composition identical or similar to the one of the carrier-side sliding layer 211 or the liner-side sliding layer 214 proposed above.

The adhesive layer 213 may be part of the liner-side sliding layer 214. For example the adhesive layer 213 may be in direct contact with the counter-force liner 22, modulo a possible layer of silicone.

Before forming the functional film 212 in view of its lamination on an optical article, the counter-force liner 22 is, at least in two different zones of the counter-force liner, preferably at least three different zones, fastened to the carrier layer 20. The functional film 212 is maintained, but preferably with a positioning float thanks to the carrier-side sliding layer 211 and the liner-side sliding layer 214, in between the carrier layer 20 and the counter-force liner 22. Such fastening before forming enables to sensibly maintain the position of the functional film 212 in the receiving area with regard to the carrier layer 20 and the counter-force liner 22, in a predetermined position, at least during thermoforming. Indeed, during thermoforming, if the carrier layer or the counter-force liner move with regard to each other the functional film may be displaced or even may receive a wrong shape after thermoforming.

To this end fastening means may comprise electrostatic forces resulting from properties of the material of the counter-force liner 22 and/or of the carrier layer 20. Alternatively, the fastening means may be additional means introduced between the counter-force liner 22 to the carrier layer 20, such as glue or adhesive. The fastening means may also be the result of a process applied to the counter-force liner 22 and/or the carrier layer 20, such as a thermoplastic welding. Preferably fastening means extend outside the receiving area.

Figure 8:
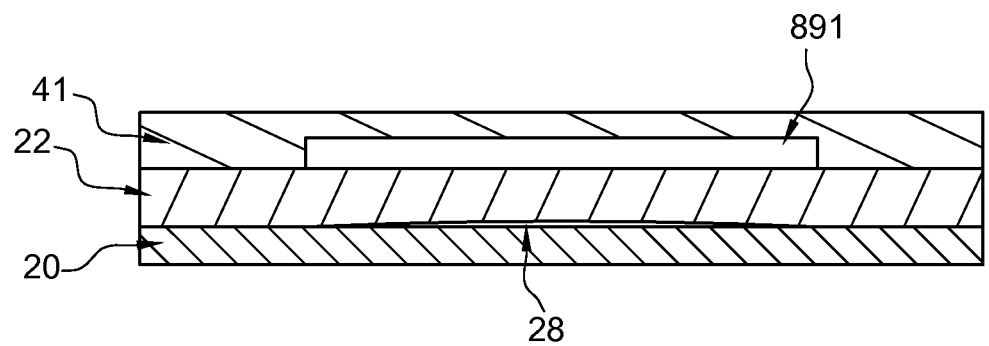

As illustrated at FIG. 8, the fastening means may also comprise a clamping system 41 enabling to clamp the counter-force liner 22 and the carrier layer 20 in a clamping zone outside, and preferably around, the receiving area.

Further to the fastening means, an adhesive layer may fasten the functional film 212 within the receiving area onto the carrier layer 20, and/or onto the counter-force liner. Said adhesive layer may be an additional layer, the adhesive layer 213, or the liner-side sliding layer or the carrier-side sliding layer being adhesive layers. Such adhesive layer enables to maintain the position of the functional film 212 in the receiving area with regard to the carrier layer 20 and/or the counter-force liner 22, in a predetermined position, before and during thermoforming, further to the effects of the fastening means.

During thermoforming, a difference of pressure is applied so as to inflate the carrier layer 20 towards the counter-force liner 22. The counter-force liner 22 is flexible enough to be inflated when the carrier layer 20 is. The device may also be use in cases where a difference of pressure is applied so as to inflate the counter-force liner 22 towards the carrier layer 20. In that second case, the benefits of the counter-force liner 22, which is supposed to be removed before a lamination of the functional film on an optical article, are mainly to act as a protection against pollution during forming, or to maintain a surface aspect of an adhesive layer 213 which may otherwise change during thermoforming.

In particular the counter-force liner 22 is configured to be inflated when positive pressure is applied on the face of the carrier layer 20 opposed to the counter-force liner 22.

When being inflated because of the pressure applied on the carrier layer 20, the counter-force liner 22 applies a counter-force to the functional film 212, on sensibly the whole area of said functional film 212. Thus delamination of some of the edges of the functional film 212 is limited or even prevented.

After forming and, possibly also before, the counter-force liner 22 may be in contact with the carrier layer 20 for substantially each zone of the counter-force liner 22 which is not in contact with the functional film 212 or which is not facing the receiving area. According to embodiments, fastening between the carrier layer 20 towards the counter-force liner 22 is done essentially all around the receiving zone.

Pressure applied to the carrier layer can be positive pressure applied to the carrier layer or more generally a positive difference of pressure between a side of the multi-layered film 2 comprising the carrier layer 20 and a side of the multi-layered film 2 comprising the counter-force liner 22.

Thermoforming Machine

As illustrated at FIG. 10, a thermoforming machine can be used to thermoform a multi-layered film 2 according to various embodiments as recited above. The thermoforming machine can comprise an annular support member 40 on which the multi-layered film 2 is intended to be positioned. In particular, the carrier layer is positioned in contact of the annular support member 40. The thermoforming machine also comprises a clamping member 41, that can include a groove as proposed below in a particular embodiment. The clamping member 41 can be moved between an open position wherein the multi-layered film 2 can be introduced upon the annular support member 40 in view of being thermoformed, or extracted once being thermoformed, and a closed position wherein the carrier layer 20 and the counter-force liner 22 of the multi-layered film 2 are clamped one against the other, being sandwiched by said clamping element 41 and said annular support member 40 in a clamping zone of the multi-layered film 2, outside the functional film, i.e. outside the corresponding receiving area. Said clamping zone is referenced with number 13 in the embodiments illustrated at FIG. 2. In the closed position of the clamping member, the multi-layered film 2, and in particular the carrier layer 20 that contacts the annular support member, obstructs the opening of the annular support member 40. In an alternative machine, the machine is adapted to clamp the carrier layer 20 bearing the functional film and to a separate fixing means for the counter force liner 22, for example another part of the clamping element 41.

The machine includes a heating and pressurizing system 50. For instance, said heating and pressurizing system is configured to provide hot air flow under pressure on the carrier layer side of the multi-layered film 2. The multi-layered film 2 can thus be inflated under pressure through the opening of the annular support member 40.

The heating and pressurizing system 50 is adapted to heat the carrier layer, and the functional film to a temperature of about 100° C. to 140° C., for example about 120° C. to about 130° C. during the thermoforming step. The temperature for thermoforming may also be between 80° C.-140° C., for example 100° C.-130° C., for example 115° C. to 125° C., or about 120° C. Concurrently the machine is adapted to provide a positive pressure to the carrier side during the thermoforming. Said pressure may rise to about 2 or 3 bars. The machine may further have a controlling system for increasing the temperature and/or the pressure, with a chosen rate, with or without pauses in said increase, until a predetermined time or a predetermined deformation of the carrier layer or of the counter-force liner is reached.

Gas Venting System

As illustrated at FIG. 1, the presence of the functional film 212 and of, in particular embodiments, other layer(s), between the PET carrier layer 20 and the counter-force liner 22 generates a possible location for a gas trap Z9 at the vicinity of said functional film. Presence of gas may also result from release due to reactions in one or more layers of the multi-layered film 2 when heated during thermoforming.

If gas is trapped within the multi-layered film 2, it may cause defects on the multi-layered film 2 during thermoforming. Indeed, during thermoforming the multi-layered film 2 reaches high temperatures, for instance more than 120° C. When facing high temperature, trapped gas may thus increase pressure within the multi-layered film 2, causing the above-mentioned defects. Defects may prevent laminating the functional film on the optical article with good quality results. In particular, the gas that has interfered in the thermoforming process may cause partial delamination, for instance in the form of folds and or creases, of one or more of the layers of the multi-layered film 2.

Delamination may appear between the various layers in the multi-layered film 2. With reference to the embodiment of FIG. 1, the defects can be formed, between the carrier layer 20 and the sliding layer 211, or between the sliding layer 211 and the functional film 212, or between the functional film 212 and adhesive layer 213 or the liner-side sliding layer 214 or the counter-force liner 22. Such folds or creases, or wrinkles or bubbles, may change the shape of the thermoformed functional film. Accordingly, such defects would be apparent on the functional film even after laminating and fixing said functional film onto the optical article.

According to various embodiments a gas venting system is configured for enabling gas that is present in the vicinity of the receiving area in between the carrier layer and the counter-force liner to exhaust at least partially out of said multi-layered film 2 even when said functional film is present in said receiving area in between the carrier layer 20 and the counter-force liner 22.

According to various embodiments, the gas venting system opens at the outer contour of the multi-layered film 2. According to particular embodiment, in plan view, the gas venting system is positioned along a diametric axis of the multi-layered film 2.

As explained hereafter with various embodiments, the gas venting system can be included in the multi-layered film 2, as illustrated with examples of FIGS. 4 to 7, but also the gas venting system can be exterior to the multi-layered film 2 as in the embodiment of FIG. 8. The gas venting system can also be part of the multi-layered film 2 as illustrated by the embodiments of FIGS. 9a to 9g. Gas venting path is indicated with reference 28 in FIGS. 4 to 8.

Figure 4:
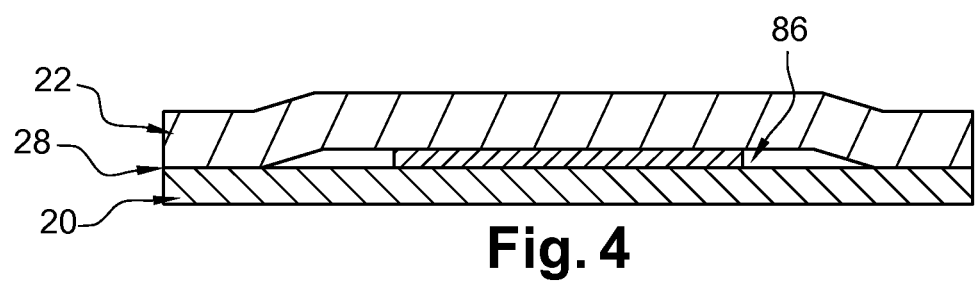
FIG. 4 is a cross-sectional view of FIG. 3 according to cut line IV, showing the gas venting system arranged between the carrier layer and the counter-force liner.

According to embodiments, as illustrated at FIG. 4, the gas venting system comprises an elevating structure that is arranged between the carrier layer 20 and the counter-force liner 22. The elevating structure can comprise a tape or band 86 of material positioned between the carrier layer 20 and the counter-force liner 22. The tape or band can be taped onto the counter-force liner 22 or the carrier layer 20.

Figure 5:
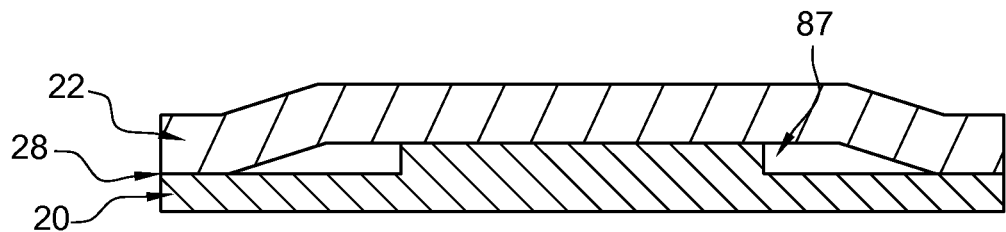

In a particular embodiment illustrated at FIG. 5 the elevating structure comprises a part 87 of the carrier layer 20 that forms at least one ridge or bump directed towards the counter-force liner 22.

Figure 6:
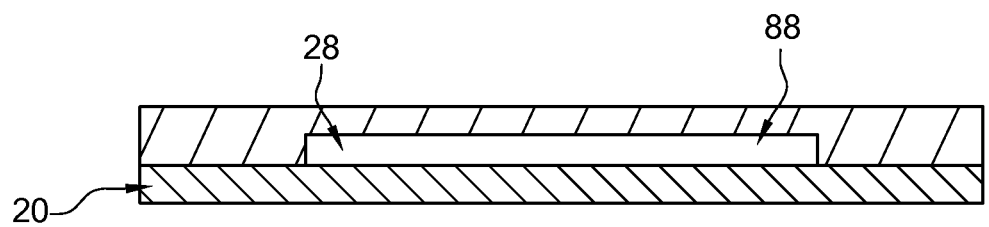
Figure 7:
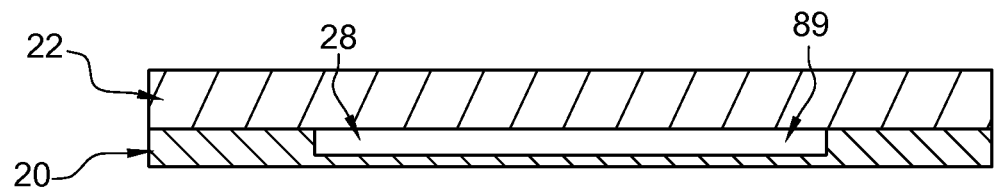

In an embodiment as illustrated in FIG. 6, the gas venting system comprises a depression or groove 88 arranged in a face of the counter-force liner 22 directed towards the carrier layer 20. In an embodiment as illustrated in FIG. 7, the gas venting system comprises a depression or groove 89 arranged in a face of the carrier layer 20 directed towards the counter-force liner 22.

According to a particular embodiment, illustrated for instance at FIG. 8, the gas venting system comprises a groove 891 arranged in a face of a clamping member 41. Said clamping member 41 may be part of a forming machine, for instance a thermoforming machine as presented above. Said grooved face may be intended to be applied on the multi-layered film 2 during the forming operation of the multi-layered film 2.

According to various embodiments, the gas venting system is arranged, in plan view of the multi-layered film 2, so as to extend beyond the perimeter of the functional film layer 212 or beyond the receiving area. In other words the gas venting system is arranged outside the zone in which the thermoplastic film 212 extends.

The gas venting system may be configured such that the gas, that is present in the vicinity of the receiving area in between the carrier layer 20 and the counter-force liner 22, exhaust through the counter-force liner 22 and/or the carrier layer 20.

According to embodiments, at least one of the counter-force liner 22 and of the carrier layer 20 is permeable to air in at least an exhaust zone in the vicinity of the receiving area. In particular and as illustrated with FIGS. 9a to 9g, permeability can be obtained by providing the counter-force liner 22 and/or the carrier layer 20 with holes 98. The holes may be micro-holes. Said holes can thus form part of the gas venting system.

Holes can be arranged according to various design as illustrated at FIGS. 9a to 9g.

As illustrated at FIG. 9a, holes can be provided on sensibly the whole area of the counter-force liner 22 and/or of the carrier layer 20. As illustrated at FIG. 9b, holes can be provided on sensibly the whole area of the counter-force liner 22 and/or of the carrier layer 20, except a zone facing the receiving area corresponding to the location of the functional film 212 in plan view. As illustrated at FIG. 9c, holes can be provided in a zone of the counter-force liner 22 and/or of the carrier layer 20, that extends, in plan view, between the clamping zone 13 and the receiving area corresponding to the location of the functional film 212 in plan view. As illustrated at FIG. 9d, holes can be provided in a zone of the counter-force liner 22 and/or of the carrier layer 20, that extends, in plan view, according to a thin path sensibly regularly along the internal contour of the clamping zone 13. As illustrated at FIG. 9e, holes can be provided in a zone of the counter-force liner 22 and/or of the carrier layer 20, that extends, in plan view, according to a thin path sensibly regularly along the external contour of the receiving area corresponding to the functional film 212. Holes can be provided in a zone of the counter-force liner 22 and/or of the carrier layer 20, that extends, in plan view, according to a thin path along two opposite regions of the internal contour of the clamping zone 13. In FIG. 9f the two opposite regions provided with hole have crescent moon shapes. As illustrated at FIG. 9g, holes can be provided in a zone of the counter-force liner 22 and/or of the carrier layer 20, that comprises two opposite regions, with a generally quadrangular shape, proximate the internal contour of the clamping zone 13.

According to embodiments, the counter-force liner 22 and/or the carrier layer 20 can be provided with holes in at least an exhaust zone in the vicinity of the receiving area. According to a particular aspect the exhaust zone covers only an area in the vicinity of the receiving area. According to another aspect, the exhaust zone covers only part of the perimeter of the receiving area.

An optical device can be obtained according to a method using a multi-layered film 2 as recited below according to various embodiments and using an optical article with a receiving surface intended to be covered by the functional film.

After forming of the multi-layered film 2, the counter-force liner is removed from the multi-layered film 2, thus making apparent the functional film layer, and if present the adhesive layer 213 and/or the liner-side sliding layer 214.

The method also includes arranging the functional film layer 212, possibly via said adhesive layer 213 and/or said liner-side sliding layer 214, on the receiving surface of the optical article. In an embodiment present, the liner-side sliding layer 214 may be removed after forming in view of the laminating step.

According to particular aspect, the functional film layer 212 can be attached to the optical article by means of an adhesive layer added to the optical article that can be independent of the multi-layered film, or that can be a layer of said multi-layered film, such as said adhesive layer 213, or the liner-side sliding layer. Said adhesive layer is most preferentially an optical grade adhesive layer, and preferentially a PSA. In an embodiment, said adhesive layer is the liner-side sliding layer and is an optical grade PSA.

In a particular, a laminating machine is used in order to enable a lamination of the functional film, born by the carrier layer, onto an optical article. Said laminating machine has mobile elements adapted for approaching the thermoformed functional film toward the optical article and/or for approaching the optical article toward the thermoformed functional film. Thereafter the functional film is brought in contact with the optical article. In a particular embodiment the thermoformed functional film, fixed onto the carrier layer presents a convex shape and is brought in contact with a concave face of the optical article.

In an embodiment a positive pressure is applied from the side of the carrier so as to push the functional film onto the face of the optical article.

The pressure applied may reach 2 or 3 bars.

The pressuring step may be done with a temperature applied onto the film of about 25 to 80° C. The temperature for thermoforming may also be between 80° C.-140° C., for example 100° C.-130° C., for example 115° C. to 125° C., or about 120° C.

The pressure may be maintained during a duration comprised between 10 seconds and 10 minutes. This enables to ensure that the adhesive layer is correctly adhering the functional film onto the optical article.

Thereafter, a cooling step may be applied in some embodiments.

Eventually, the carrier layer is removed from the functional film. If present the carrier-side sliding layer is also removed.

Further to these last steps, an optical article comprising a film fixed on one of its surfaces is obtained, with no or reduced defects. Defects are prevented at least using the counter-force liner and in some embodiments, further defects may be prevented using the possible sliding layers, and the possible air vents.

In a particular embodiment, the laminating machine is the thermoforming machine. In a further example the carrier layer is clamped in the same clamping system during both the thermoforming and the lamination. The carrier layer may possibly be declamped so as to remove the counter force liner. In such machine a cooling step may be applied between the thermoforming and the lamination.

According to a particular embodiment, the silicone that may be present on the carrier layer and/or the counter-force liner may be a silicone provided by company Siliconature under product reference SILPHAN S50.

According to various embodiments, the carrier side of the counter-force liner may be in contact directly with the functional film or one of the layers on top of the functional film which are intended to be present on the optical article and intended to bring a function to the optical article.

According to an embodiment, hereafter Examples 1 and 2, the functional film is applied on the convex face of a lens having a curvature radius of 81 mm. The functional film is thermoformed so as to have a curvature radius of 81 mm. In the examples 1 and 2, the carrier side sliding layer is a PSA provided by firm 3M under reference 8141, and the carrier side sliding layer is provided with a protective sliding film (that can be deleted after thermoforming) provided by firm NITTO under reference SWT10 or SWT 10+R.

In example 1 no counter force liner according to the embodiments is used and slight delamination and bubbles type defect are observed during thermoforming.

However, once a counter force liner is present, no delamination appears during thermoforming.

According to examples 3 and 4, the functional film is applied on the concave face of a lens having a curvature radius of 90 mm. The functional film is thermoformed so as to have a curvature radius of 76 mm. In examples 3 and 4, the carrier side sliding layer is a PSA provided by firm NITTO under reference CS9621, and the carrier side sliding layer is provided with a protective sliding film (that can be deleted after thermoforming) provided by firm NITTO under reference SWT10 or SWT 10+R.

In example 3 no counter force liner according to the embodiments is used and very slight bubbles are observed during thermoforming. However after lamination on the optical article, bubble type defects are observed through the functional film.

However, once a counter force liner is present, no defects are identified during thermoforming or after lamination.

According to an embodiment, the device comprises:
a carrier layer,
a carrier side sliding layer,
a functional film provided with a treatment that may comprise a hard coat treatment and/or an anti-reflective treatment and/or a smudge-proof treatment;
a liner side sliding layer;
a counter-force liner.

In a variant, the device consists of the above-mentioned layers.

In example 5, which illustrate the above embodiment, the functional film is applied on the concave face of a lens having a curvature radius of 90 mm. The functional film is thermoformed so as to have a curvature radius of 76 mm. Further the device comprises, and preferably consist in:

a carrier layer,
a carrier side sliding layer, which is a PSA provided by firm 3M under reference 9088, also referred as High Performance Double Coated Tape 9088 with adhesive 375,
a functional film, which comprises a cellulose triacetate (TAC, for triacetate cellulose, in French) provided with a treatment referred as "Crizal" (trademark of the firm Essilor International) that comprises a hard coat treatment and an anti-reflective treatment and an anti-smudge treatment;
an optical grade liner side sliding layer, which is a pressure sensitive adhesive (PSA) according to PCT-Application No WO2017168192 filed on Mar. 29, 2016, included herein by reference;
a counter-force liner provided by firm PPI Adhesive Products under reference PPI 0601 (0.075 mm) SILICONISED POLYESTER FILM.

And the optical grade liner side sliding layer is further used after thermoforming as the adhesive layer for the lamination onto the optical article. Said optical grade liner side sliding layer is the only layer between the optical article and the TAO film after lamination.

According to example 5, no delamination or defects are observed after thermoforming or after lamination.

The invention claimed is:

1. A film structure comprising:
a carrier layer;
a counter-force liner;
at least one functional film disposed in between said carrier layer and said counter-force liner in a predetermined receiving area;
a first adhesive layer that fastens the at least one functional film within the predetermined receiving area onto the carrier layer; and
a second adhesive layer that fastens the at least one functional film within the predetermined receiving area onto the counter-force liner,
wherein the carrier layer and the counter-force liner are larger than the functional film, and
the counter-force liner is attached to and in direct contact with the carrier layer, at least on a portion of a zone outside the predetermined receiving area on at least two opposite sides of the predetermined receiving area.

2. The film structure of claim 1, wherein the counter-force liner is more flexible than the carrier layer.

3. The film structure of claim 1, further comprising a carrier-side sliding layer that is positioned in between said carrier layer and said functional film, said carrier-side sliding layer being configured to enable a positioning float of the functional film with respect to the carrier layer.

4. The film structure of claim 1, further comprising a liner-side sliding layer configured to enable a positioning float of the functional film with respect to the counter-force liner, the liner-side sliding layer being disposed in between said counter force layer and said functional film, either in contact with the counter-force liner or in contact with a layer fastened to the counter-force liner.

5. The film structure of claim 4, further comprising a third adhesive layer between the functional film and the liner-side sliding layer.

6. The film structure of claim 4, wherein the liner-side sliding layer is an optical grade material and is configured to be laminated onto an optical article to fasten the functional film to said optical article.

7. The film structure of claim 1, wherein the counter-force liner is configured to be in contact with the carrier layer for substantially each zone of the counter-force liner which is not in contact with the functional film or which is not in the receiving area.

8. The film structure of claim 7, further comprising a gas venting system configured to enable gas that is present in the vicinity of the receiving area, in between the carrier layer and the counter-force liner, to exhaust at least partially out of said vicinity.

9. A machine for forming a functional film of the film structure according to claim 1, the machine comprising:
a pressurizing system; and
a holding device configured to hold the film structure,
wherein the pressurizing system and the holding device are configured to, when the film structure is held at a periphery thereof outside the functional film, apply a pressure difference on the carrier layer to inflate the carrier layer towards the counter-force liner, so that the functional film pushes onto the counter-force liner, while said counter-force liner applies a counter-force onto said functional film.

10. An optical device comprising
an optical article;
a functional film layer of the film structure according to claim 1,
wherein said functional film layer is arranged on a receiving face of the optical article.

11. A method for forming a functional film for lamination on an optical article, said method comprising the following steps:
providing a film structure comprising at least a functional film, a carrier layer, and a counter-force liner, said functional film being in between said carrier layer and said counter-force liner, in a receiving area, the carrier layer and the counter-force liner being larger than the functional film, the counter-force liner being fastened, directly or indirectly, to the carrier layer at least on a portion of a zone outside the receiving area on at least two opposite sides of the receiving area; and
forming the functional film by applying a pressure on the carrier layer to inflate the carrier layer towards the counter-force liner, the counter-force liner applying a counter-force to the functional film.

12. The film structure of claim 2, further comprising a carrier-side sliding layer that is positioned in between said carrier layer and said functional film, said carrier-side sliding layer being configured to enable a positioning float of the functional film with respect to the carrier layer.

13. The film structure of claim 2, further comprising a liner-side sliding layer configured to enable a positioning float of the functional film with respect to the counter-force liner, the liner-side sliding layer being disposed in between said counter force layer and said functional film, either in contact with the counter-force liner or in contact with a layer fastened to the counter-force liner.

14. The film structure of claim 1, wherein the counter-force liner has a contact area with the functional film, said contact area being planar before forming the functional film.

15. The film structure of claim 1, wherein the counter-force liner has a contact area with the carrier layer, said contact area being planar before forming the functional film.

16. The method of claim 11, wherein the forming step is a thermoforming step that further comprises heating the carrier layer, the functional film, and the counter-force liner.

17. The method of claim 11, further comprising, after forming the functional film, detaching the counter-force liner from the functional film and the carrier layer.

18. The method of claim 17, wherein, after forming the functional film, the functional film is attached to the optical article by an adhesive layer.

* * * * *